Aug. 4, 1959     F. BRONSTERT     2,898,393

ELECTRODE ARRANGEMENT

Filed Aug. 17, 1956

INVENTOR.
Franz Bronstert
BY Michael S Striker
Attorney

United States Patent Office 2,898,393
Patented Aug. 4, 1959

2,898,393

ELECTRODE ARRANGEMENT

Franz Bronstert, Frankfurt am Main, Germany, assignor to Accumulatoren-Fabrik Aktiengesellschaft, Werk Hagen, Hagen, Westphalia, Germany Application August 17, 1956, Serial No. 604,755

Claims priority, application Germany August 18, 1955

6 Claims. (Cl. 136—43)

The present invention relates to an electrode arrangement, and more particularly to an electrode arrangement for use in galvanic cells, storage batteries and the like.

Galvanic elements, storage batteries and the like are known which include electrodes consisting of a plurality of vertical electrode rods which are arranged spaced from each other and interconnected by preferably horizontal electrically conductive connecting members. In such elements, batteries and the like, each of the vertical electrode rods is surrounded with active mass, and the active mass around each electrode rod is provided with a non-conductive tubular covering.

These tubular coverings of the active mass generally consist of hard rubber tubes or tubes of synthetic materials which are slitted at a right angle to the axis of the tube. These tubes are capable to a considerable degree to withstand the tendency of the active mass to expand. However, the non-slitted portions thereof are impermeable for the electrolyte, and the entire arrangement increases unfavorably the inner resistance of the current. It has been attempted to overcome these disadvantages by providing tubular coverings of porous materials, such as microporous hard rubber tubes, or mats or fabrics of glass wool or synthetic fiber. However, these attempts did not succeed because the stability and firmness of the porous tubes was insufficient to restrain and withstand the expansion of the active mass in the course of operation of the device. It has also been attempted to form coverings for the active mass wihch comprise a porous tubular member covered on its outer side by a perforated tube of synthetic material or hard rubber. Here again, the disadvantage of impermeable areas between the individual perforations of the outer tube was not overcome.

It is therefore an object of the present invention to provide a covering for electrode rods and the active mass surrounding the same which overcomes the aforementioned disadvantages.

It is another object of the present invention to provide a covering for the active mass surrounding an electrode rod, which covering will withstand the tendency of the active mass to expand.

It is a further object of the present invention to provide a covering for the active mass surrounding an electrode rod of a galvanic cell, storage battery and the like, which covering will be highly permeable for the electrolyte and will withstand the tendency of the active mass to expand.

Other objects and advantages of the present invention will become apparent from a further reading of the description and the appended claims.

With the above and other objects in view, the present invention mainly comprises in a device of the character described, at least one body of active mass, an electrode rod embedded in the body of active mass, and an electrolyte-permeable covering about the body of active mass, the covering consisting essentially of glass fibers having a diameter of less than 10 $\mu$ and having a chemical composition of between 68 and 72% $SiO_2$, between 5 and 3% $Al_2O_3$ plus $Fe_2O_3$, between 9 and 11% CaO, between 7 and 5% $Na_2O$, and between 11 and 9% $K_2O$.

The present invention also comprises in a device of the charatcer described, an electrode arrangement, comprising, in combination, a plurality of substantially vertical electrode rods spaced from each other, a plurality of substantially horizontal electrically conductive members interconnecting said spaced electrode rods, a body of active mass at least partially surrounding each of the electrode rods, respectively, and a tubular, electrolyte-permeable covering about each of the bodies of active mass, respectively, the covering consisting essentially of glass fibers having a diameter of less than 10 $\mu$ and having a chemical composition of about 70% $SiO_2$, about 4% $Al_2O_3$ plus $Fe_2O_3$, about 10% CaO, about 6% $Na_2O$, and about 10% $K_2O$.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
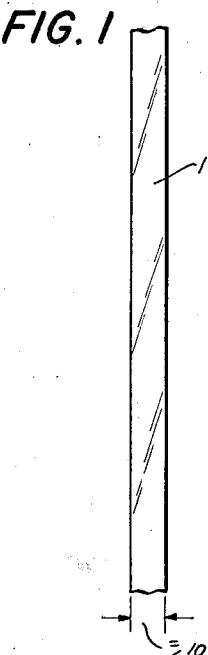
Fig. 1 is an enlarged schematic view of a portion of a glass fiber which may be used in the forming of an electrolyte-permeable covering according to the present invention.

Referring now to the drawing, Fig. 1 shows a glass fiber 1 such as is employed in forming the fabric or mat of the electrode covering according to the present invention. The diameter of the glass fiber is equal to or less than 10 $\mu$, preferably about 7 $\mu$.

Figure 2:
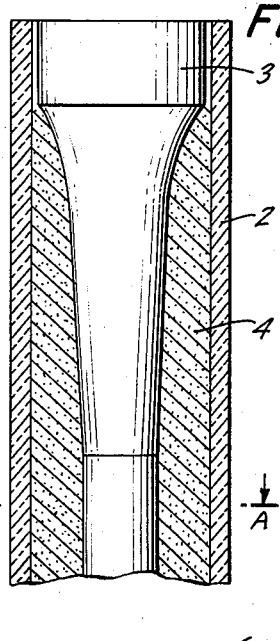
Fig. 2 is an elevational view in cross-section of a covered electrode according to the present invention.
Figure 3:
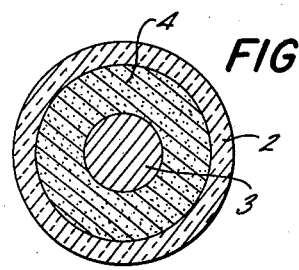
Fig. 3 is a plane view in cross-section of a covered electrode according to the present invention.

As illustrated in Figs. 2 and 3 of the drawing, a tubular covering 2 is formed of material such as glass fibers 1. This highly porous, non-conductive tubular covering is arranged concentrically about an electrode rod 3 made of lead. The annular space 4 between the electrode rod 3 and the tubular covering 2 is filled with active mass, such as $PbO_2$.

Figure 4:
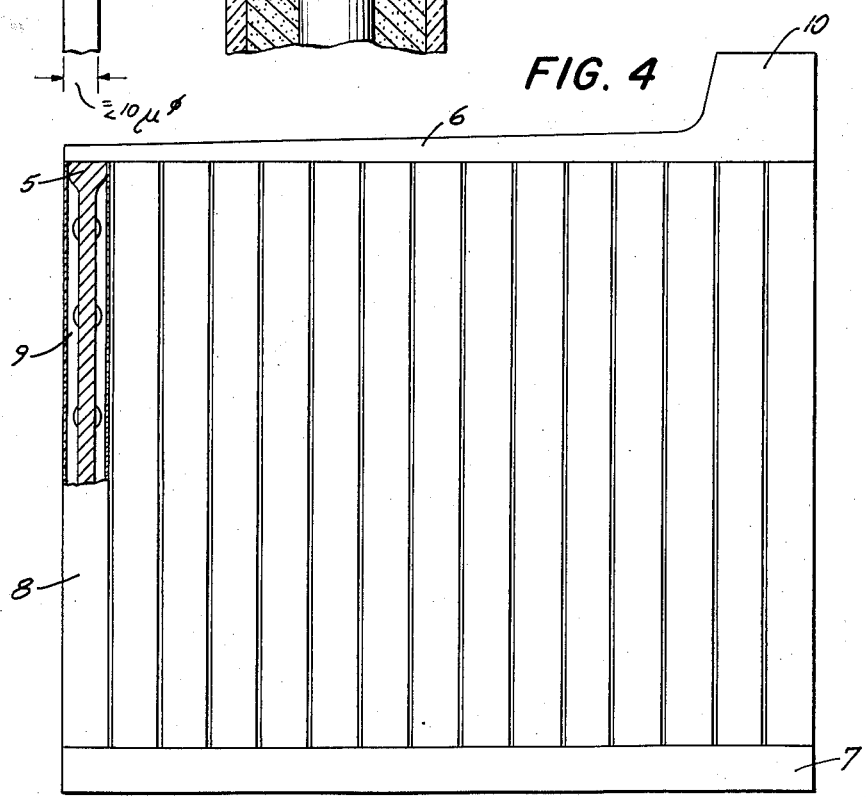
Fig. 4 is an elevational view partly in cross-section of a battery plate comprising a plurality of vertical electrode rods spaced from each other and conductively interconnected, each provided with a covering according to the present invention.

Fig. 4 illustrates an entire battery plate according to the present invention which comprises a plurality of substantially vertical electrode rods 5 which are spaced from each other and which are electrically conductively interconnected by conductive members 6 and 7. Each individual electrode rod 5 is embedded in a body of active mass 9 about which is arranged the electrolyte-permeable covering 8. The battery plate is provided with a terminal 10.

The glass fibers of which according to the present invention the electrode covering is formed, consist of between 68 and 72% $SiO_2$, between 5 and 3% $Al_2O_3$ and $Fe_2O_3$, between 9 and 11% CaO, between 7 and 5% $Na_2O$, and between 11 and 9% $K_2O$.

Surprisingly it has been found that the strength of glass fibers can be increased by employing glass fibers having a diameter of less than 10 $\mu$, to such an extent that mats or fabrics made of such glass fibers will withstand the pressure of the active mass. It has been found that by reducing the diameter of the glass fibers, the strength thereof increases beyond the strength even of high grade steel of similar dimensions. However, the concurrent increase in surface area of the glass fibers which is caused by reduction of the diameter thereof, makes the same vulnerable to chemical attack by the electrolyte and to oxidation by oxygen emanating in statu nascendi from the active mass.

According to the present invention it has now been found that glass fibers of very small diameter will be resistant against chemical attack by the electrolyte and against oxidation, if composed of between 68 and 72% $SiO_2$, between 5 and 3% $Al_2O_3$ plus $Fe_2O_3$, between 9 and 11% CaO, between 7 and 5% $Na_2O$, and between 11 and 9% $K_2O$. Preferably the composition of the glass fibers is about 70% $SiO_2$, about 4% $Al_2O_3$ plus $Fe_2O_3$, about 10% CaO, about 6% $Na_2O$, and about 10% $K_2O$.

By using tubular coverings for the active mass consisting according to the present invention of glass fibers of one of the above compositions and having a diameter of less than 10 $\mu$, preferably of about 7 $\mu$, an increase in the amount of current of 50% over the amount of current obtained with conventional slitted hard rubber coverings, was obtained. Upon continuous operation in storage batteries it was found that the covering according to the present invention in spite of lesser thickness than conventional slitted hard rubber coverings, could withstand the pressure of the active mass during one thousand discharges of the battery without bulging or breaking, since the individual glass fibers were not weakened by chemical attack thereon.

It will be understood that each of the elements described above, or two or more together, may also find a useful application in other types of electrode arrangements differing from the types described above.

While the invention has been illustrated and described as embodied in an electrode covering, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electrode arrangement, at least one body of active mass; an electrode rod embedded in said body of active mass; and an electrolyte-permeable covering about said body of active mass, said covering consisting essentially of glass fibers having a diameter of less than 10 $\mu$ and having a chemical composition of between 68 and 72% $SiO_2$, between 5 and 3% of at least one substance selected from the group consisting of $Al_2O_3$ and $Fe_2O_3$, between 9 and 11% CaO, between 7 and 5% $Na_2O$, and between 11 and 9% $K_2O$.

2. In an electrode arrangement, a plurality of bodies of active mass; an electrode rod embedded in each of said bodies of active mass; and an electrolyte-permeable covering about each of said bodies of active mass, said covering consisting essentially of glass fibers having a diameter of less than 10 $\mu$ and having a chemical composition of about 70% $SiO_2$, about 4% of at least one substance selected from the group consisting of $Al_2O_3$ and $Fe_2O_3$, about 10% CaO, about 6% $Na_2O$, and about 10% $K_2O$.

3. In an electrode arrangement, an insulating, electrolyte-permeable electrode covering consisting essentially of glas fibers having a diameter of less than 10 $\mu$ and having a chemical composition of between 68 and 72% $SiO_2$, between 5 and 3% of at least one substance selected from the group consisting of $Al_2O_3$ and $Fe_2O_3$, between 9 and 11% CaO, between 7 and 5% $Na_2O$, and between 11 and 9% $K_2O$.

4. In an electrode arrangement, a plurality of bodies of active mass; an electrode rod embedded in each of said bodies of active mass; and an electrolyte-permeable covering about each of said bodies of active mass, said covering consisting essentially of a glass fiber fabric, each of the glass fibers thereof having a diameter of less than 10 $\mu$ and having a chemical composition of between 68 and 72% $SiO_2$, between 5 and 3% of at least one substance selected from the group consisting of $Al_2O_3$ and $Fe_2O_3$, between 9 and 11% CaO, between 7 and 5% $Na_2O$, and between 11 and 9% $K_2O$.

5. In an electrode arrangement, in combination, a plurality of substantially vertical electrode rods spaced from each other; a plurality of substantially horizontal electrically conductive members interconnecting said spaced electrode rods; a body of active mass at least partially surrounding each of said electrode rods, respectively; and a tubular, electrolyte-permeable covering about each of said bodies of active mass, respectively, said covering consisting essentially of glass fibers having a diameter of less than 10 $\mu$ and having a chemical composition of between 68 and 72% $SiO_2$, between 5 and 3% of at least one substance selected from the group consisting of $Al_2O_3$ and $Fe_2O_3$, between 9 and 11% CaO, between 7 and 5% $Na_2O$, and between 11 and 9% $K_2O$.

6. In an electrode arrangement, at least one body of active mass; an electrode rod embedded in said body of active mass; and an electrolyte-permeable covering about said body of active mass, said covering consisting essentially of glass fibers having a diameter of about 7 $\mu$ and having a chemical composition of between 68 and 72% $SiO_2$, between 5 and 3% of at least one substance selected from the group consisting of $Al_2O_3$ and $Fe_2O_3$, between 9 and 11% CaO, between 7 and 5% $Na_2O$, and between 11 and 9% $K_2O$.

References Cited in the file of this patent

UNITED STATES PATENTS

| | | |
|---|---|---|
| 2,128,702 | Gelstharp | Aug. 30, 1938 |
| 2,195,212 | Hall | Mar. 26, 1940 |
| 2,210,254 | Peddrick | Aug. 6, 1940 |
| 2,343,970 | Galloway | Mar. 14, 1944 |
| 2,350,752 | Graf | June 6, 1944 |
| 2,373,281 | White | Apr. 10, 1945 |